United States Patent
Dhanda et al.

(10) Patent No.: US 8,737,002 B1
(45) Date of Patent: May 27, 2014

(54) MAGNETIC RECORDING DISK WITH PATTERNED NONDATA ISLANDS WITH DIFFERENT SIZES AND OPPOSITE POLARITY AND METHOD FOR MAKING THE DISK

(71) Applicant: HGST Netherlands B.V., Amsterdam (NL)

(72) Inventors: Abhishek Dhanda, San Jose, CA (US); Michael Konrad Grobis, San Jose, CA (US); Toshiki Hirano, San Jose, CA (US); Tetsuo Semba, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/850,582

(22) Filed: Mar. 26, 2013

(51) Int. Cl.
G11B 5/09 (2006.01)

(52) U.S. Cl.
USPC .............. 360/48; 360/49; 360/61; 360/77.08; 360/77.07

(58) Field of Classification Search
None
See application file for complete search history.

(56) References Cited

U.S. PATENT DOCUMENTS

| | | | |
|---|---|---|---|
| 7,236,325 B2 | 6/2007 | Albrecht et al. | |
| 7,715,137 B2 | 5/2010 | Albrecht et al. | |
| 7,848,040 B2 | 12/2010 | Yamamoto | |
| 8,154,813 B2 | 4/2012 | Weller et al. | |
| 8,252,153 B2 | 8/2012 | Albrecht et al. | |
| 8,310,780 B2 | 11/2012 | Imaino et al. | |
| 2009/0097160 A1* | 4/2009 | Yamamoto | 360/135 |
| 2010/0067145 A1 | 3/2010 | Pokharel et al. | |
| 2010/0177437 A1 | 7/2010 | Wagner | |
| 2011/0188152 A1 | 8/2011 | Albrecht et al. | |
| 2011/0279924 A1 | 11/2011 | Albrecht et al. | |
| 2011/0286125 A1* | 11/2011 | Lille et al. | 360/31 |
| 2012/0154949 A1 | 6/2012 | Pokharel et al. | |
| 2012/0314319 A1 | 12/2012 | Olson et al. | |

OTHER PUBLICATIONS

Richter et al., "Recording on Bit-Patterned Media at Densities of 1 Tb/in2 and Beyond", IEEE Transactions on Magnetics, vol. 42, No. 10, October 2006, p. 2255-2260.

Xu et al., "Recording Performance Analysis of Pre-patterned-Deposition Bit Patterned Media Through Micromagnetic Simulation", The 11th International Conference on Parallel and Distributed Computing, Applications and Technologies 2010 IEEE DOI 10.1109.

Sharrock, "Time dependence of switching fields in magnetic recording media", J. Appl. Phys. 76 (10), 6413, Nov. 15, 1994.

* cited by examiner

Primary Examiner — Muhammad N Edun
(74) Attorney, Agent, or Firm — Thomas R. Berthold

(57) ABSTRACT

A magnetic recording disk has nondata regions that contain a group of first nondata islands with one area and a magnetization in one perpendicular direction, and a group of second nondata islands with a smaller area and a magnetization in the opposite direction. To magnetize the nondata islands with the proper magnetization directions, a DC magnetic field much greater than the coercive field of the magnetic recording layer is applied in one direction to the entire disk to magnetize all of the nondata islands in the same direction. Then the disk is heated to a predetermined temperature, and while the disk is at this temperature, a second DC magnetic field less than the first DC magnetic field is applied for a predetermined time in the opposite direction to the entire disk. This reverses the magnetization direction of the smaller islands without switching the magnetization of the larger islands.

22 Claims, 8 Drawing Sheets

MAGNETIC RECORDING DISK WITH PATTERNED NONDATA ISLANDS WITH DIFFERENT SIZES AND OPPOSITE POLARITY AND METHOD FOR MAKING THE DISK

BACKGROUND OF THE INVENTION

1. Field of the Invention

This invention relates generally to magnetic recording disks, and more particularly to a disk with patterned nondata islands for head-positioning and data synchronization.

2. Description of the Related Art

Conventional continuous-media (CM) disks have a continuous layer of magnetic material that becomes formed into concentric data tracks containing the magnetically recorded data bits when the write head writes on the magnetic material. A variation of a CM disk is a "discrete-track media" (DTM) disk, meaning that the concentric data tracks of continuous magnetic material are radially separated from one another by concentric nonmagnetic guard bands. Bit-patterned-media (BPM) disks have been proposed to increase the data density. In a BPM disk, the magnetic recording layer on the disk is pre-patterned into small isolated data islands such that there is a single magnetic domain in each island or "bit". The single magnetic domains can be a single grain or consist of a few strongly coupled grains that switch magnetic states in concert as a single magnetic volume. To produce the required magnetic isolation of the patterned islands, the magnetic moment of the spaces between the islands must be destroyed or substantially reduced so as to render these spaces essentially nonmagnetic. In one type of patterned media, the islands are elevated regions or pillars that extend above the spaces and magnetic material covers both the islands and the spaces, but the spaces are far enough from the read/write head to not adversely affect reading or writing, so the spaces can be considered essentially nonmagnetic. Alternatively, the patterned media may be fabricated so that that there is no magnetic material in the spaces between the islands. One method proposed for making BPM disks is by nanoimprinting from a master template.

CM disks, DTM disks and BPM disks all require nondata regions that are used for read/write head positioning and data synchronization. BPM disks typically have nondata regions that are also pre-patterned, meaning that there are nondata islands separated by nonmagnetic spaces. CM disks and DTM disks may also have pre-patterned nondata regions. The proposed method for formatting disks with pre-patterned nondata regions is to DC "erase" the disk during manufacturing with a large magnet, leaving all of the nondata islands magnetized in the same direction. Thus all of the nondata islands would have a magnetization direction either "into" or "out of" the surface of the disk. However, because only a single polarity of magnetization is used with this method, half of the available signal amplitude from the nondata islands is sacrificed and thus the signal-to-noise ratio (SNR) is less than optimum.

What is needed is a recording disk with patterned nondata islands that have alternating polarity of magnetization to provide optimal SNR, and a relatively fast and low-cost method for magnetizing the nondata islands with the proper polarity.

SUMMARY OF THE INVENTION

This invention relates to a magnetic recording disk with nondata regions that contain nondata islands with different surface areas. A group of first nondata islands with one area have a magnetization in one perpendicular direction, and a group of second nondata islands with a smaller area have a magnetization in the opposite direction, i.e., opposite polarity to that of the first islands. The magnetic recording disk with the magnetizable recording layer having nondata regions with the desired pattern of first and second islands with different areas and different magnetizations is magnetized in a two-step process. First, a DC magnetic field much greater than the coercive field of the magnetic recording layer is applied in one direction to the entire disk so that all of the nondata islands on the disk are magnetized in the same direction. Then the disk is heated to a predetermined temperature, and while the disk is at this temperature, a second DC magnetic field less than the first DC magnetic field is applied for a predetermined time in the opposite direction to the entire disk. This reverses the magnetization direction of the smaller islands without switching the magnetization of the larger islands. While this second step may not reverse the magnetization of all of the smaller islands, and may reverse the magnetization of some of the larger islands, the error rate can be small enough to be acceptable.

For a fuller understanding of the nature and advantages of the present invention, reference should be made to the following detailed description taken together with the accompanying figures.

DETAILED DESCRIPTION OF THE INVENTION

Figure 1:
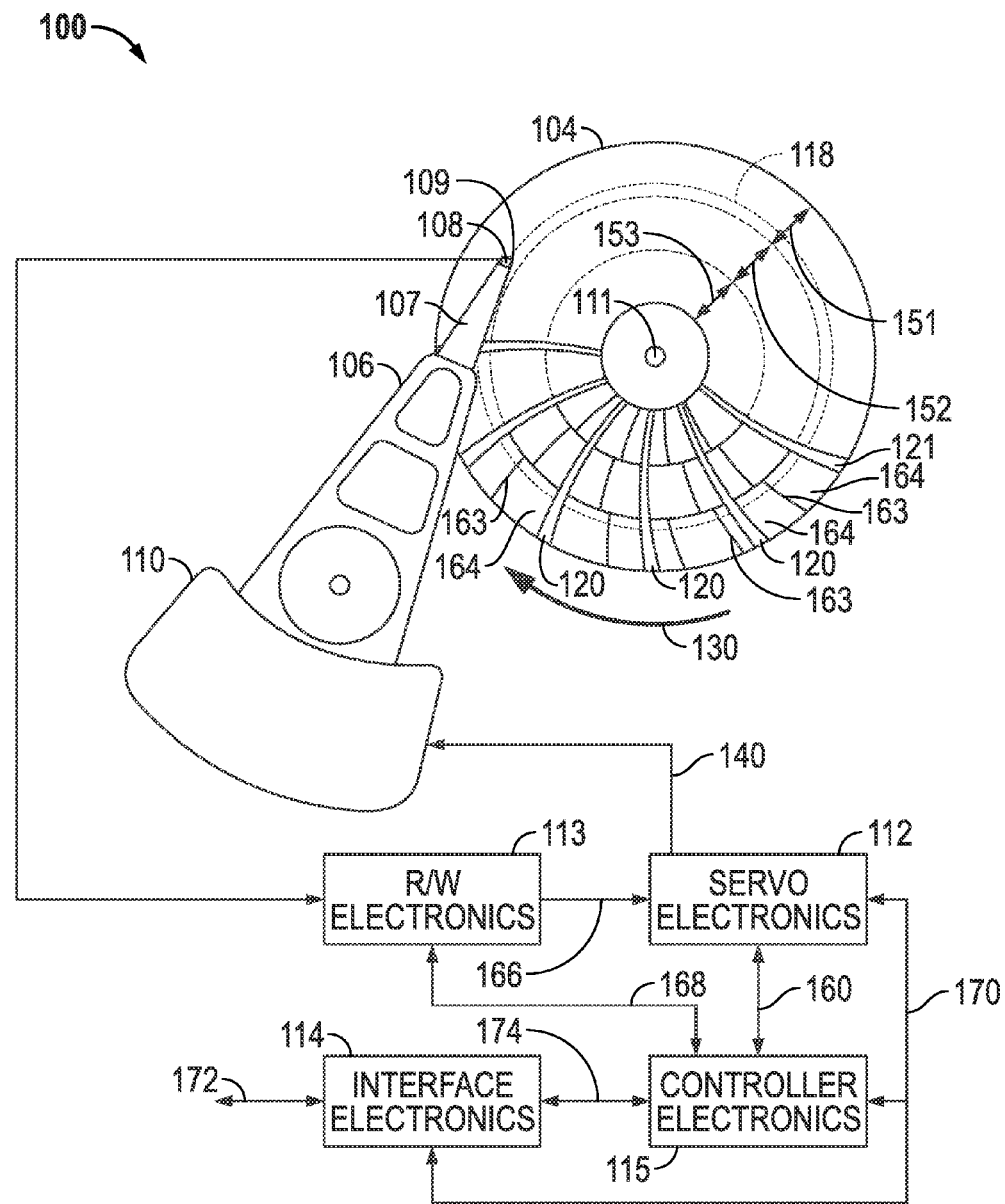
FIG. 1 is a schematic of a conventional magnetic recording disk drive illustrating the magnetic recording disk with nondata servo sectors and synchronization fields.

FIG. 1 is a schematic of a conventional magnetic recording disk drive and illustrates the magnetic recording disk with the nondata regions, specifically the servo sectors for positioning the recording heads on the data tracks and the synchronization fields for enabling the recording heads to read and write data in the data sectors. The disk drive, designated generally as 100, includes the magnetic recording disk 104, a voice coil motor (VCM) actuator 110, an actuator arm 106, a suspension 107, a head carrier or air-bearing slider 108 and a recording head 109. The recording head 109 is typically a combination of an inductive write head with a magnetoresistive read head (also called a read/write head) and is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. Only one disk surface with associated slider and recording head is shown in FIG. 1, but there are typically multiple disks stacked on a hub that is rotated by a spindle motor, with a separate slider and recording head associated with each surface of each disk.

The disk 104 has a center of rotation 111 and is rotated in direction 130. The disk 104 has a magnetic recording layer with radially-spaced concentric data tracks, one of which is shown as track 118. Each data track has a reference index 121 indicating the start-of-track. The disk drive is illustrated as a zone-bit-recording (ZBR) disk drive because the data tracks are grouped radially into a number of annular data zones, three of which are shown as zones 151, 152 and 153, but the invention is fully applicable to a disk drive that does not use ZBR, in which case the disk drive would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164.

Each data track also includes a plurality of circumferentially or angularly-spaced servo sectors 120 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 are nondata regions on the disk that are magnetized once, typically during manufacturing or formatting of the disk, and are not intended to be erased during normal operation of the disk drive.

The electronics associated with disk drive 100 include read/write (R/W) electronics 113, servo electronics 112, controller electronics 115 and interface electronics 114. In the operation of disk drive 100, the R/W electronics 113 receives signals from head 109 and passes servo information from the servo sectors 120 to servo electronics 112 and data signals from the data sectors 164 to controller electronics 115. Servo electronics 112 uses the servo information to produce a current at 140 that drives VCM actuator 110 to position head 109. Interface electronics 114 communicates with a host system (not shown) over interface 172, passing data and command information. Interface electronics 114 also communicates with controller electronics 115 over interface 174. In the operation of disk drive 100, interface electronics 114 receives a request for reading from or writing to the data sectors 164 over interface 172. Controller electronics 115 receives a list of requested data sectors from interface electronics 114 and converts them into a set of numbers that uniquely identify the disk surface, track and data sector. The numbers are passed to servo electronics 112 to enable positioning head 109 to the appropriate data sector.

If the disk drive is a "headerless" architecture disk drive, meaning that the data sectors 164 do not contain unique data sector addresses that are required to be read before data can be read from or written to the data sectors, then once the servo electronics 112 has positioned head 109 over the appropriate data track, servo electronics 112 begins executing sector computations to locate and identify the desired data sector. In brief, in the headerless architecture approach, a servo timing mark (STM) at the beginning of the servo sectors 120 is used to locate servo sectors, and a count of STMs from a servo sector containing an index mark 121 uniquely identifies each servo sector. Once the desired data sector is thus identified, the sync field preceding that data sector is detected to control the timing of data bits read from the data sector or data bits written to the data sector.

Conventional magnetic recording hard disk drives use perpendicular recording wherein the magnetized regions are oriented perpendicular to the plane of the recording layer. The conventional disk is a "continuous-media" (CM) disk wherein the recording layer is a continuous layer of magnetic material that becomes formed into concentric data tracks containing the magnetically recorded data bits when the write head writes on the magnetic material. A variation of a CM disk is a "discrete-track media" (DTM) disk, meaning that the concentric data tracks of continuous magnetic material are radially separated from one another by concentric nonmagnetic guard bands. In a DTM disk, the data tracks are typically elevated lands that contain magnetic material and the nonmagnetic guard bands are trenches or grooves that are recessed below the elevated lands. The nonmagnetic guard bands are either formed of nonmagnetic material or contain magnetic material but are recessed far enough below the elevated data tracks to not adversely the readback signals from the data tracks.

In addition to CM disks and DTM disks, magnetic recording disks with "bit-patterned media" (BPM) have been proposed to increase the data density. In BPM disks, the magnetizable material on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional CM disks wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In one type of BPM disk, the data islands are elevated, spaced-apart pillars that are separated by nonmagnetic trenches or recesses.

CM disks, DTM disks and BPM disks also require nondata regions that are angularly spaced around the disk and extend generally radially across the concentric data tracks. In BPM, the data sectors as well as the nondata regions are patterned. However, it is also possible to fabricate CM disks and DTM disks wherein just the nondata regions are patterned.

Figure 2:
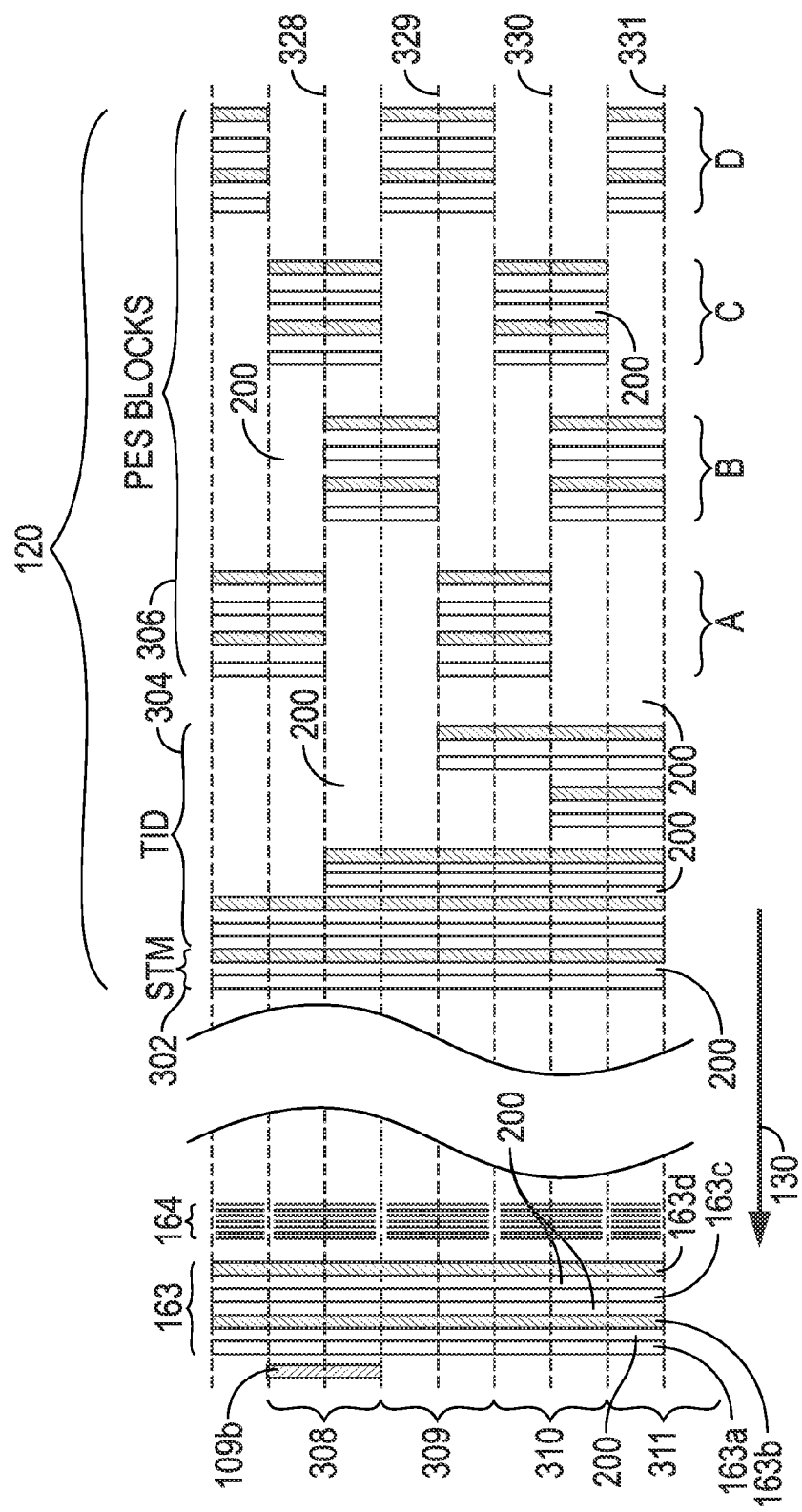
FIG. 2 is a schematic showing a portion of a patterned-media disk with a patterned sync field and a patterned servo sector spanning several data tracks, as proposed in the prior art.

FIG. 2 is a schematic showing a portion of a BPM disk with a patterned sync field 163 and a patterned servo sector 120 spanning several data tracks, as shown in U.S. Pat. No. 7,236,325 B2, which is assigned to the same assignee as this application. Four full data tracks are depicted: 308, 309, 310 and half-track 311, each having a respective track centerline 328, 329, 330 and 331. The read head 109b is shown as positioned in data track 308 and will detect the islands in sync field 163 and servo sector 120 as the disk rotates in the direction of arrow 130.

The sync field 163 is depicted with four sync marks as magnetized nondata islands 163a-163d separated by nonmagnetic spaces. The sync marks are stripes that extend across the data tracks in the radial direction, resulting in a single-frequency pattern suitable for locking a phase-locked-loop data clock prior to reading or writing data bits in the data sectors. The sync field 163 precedes the data sector 164, which shows several data islands, represented as solid lines.

The servo sector 120 is a conventional servo pattern of the type commonly used in sector servo systems and shows a greatly simplified pattern for clarity. The servo pattern includes several fields containing nondata islands, three of which are shown as servo-timing-mark (STM) field 302, track ID (TID) field 304 and position-error-signal (PES) field 305 depicted as the well-known quadrature pattern of PES islands A-D. The PES islands A-D are used to determine the fractional part of the radial position of the head. When the head is at the track centers the read-back signal amplitudes from the A islands and the B islands are equal. When the head is at the half-track positions the amplitudes from the C islands and the D islands are equal. As the head moves off-track the amplitudes from all the islands will increase or decrease. The amplitudes of the PES islands are decoded in servo electronics 112 and used to reposition the head.

Figure 3A:
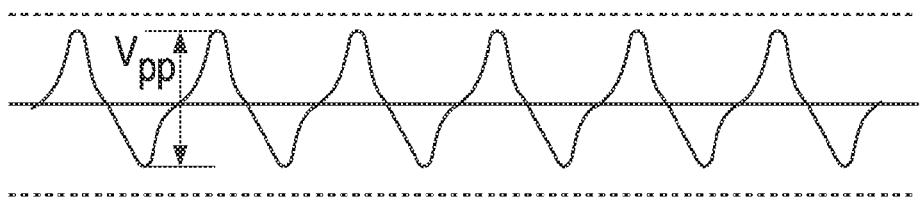
FIG. 3A is a representative signal from a disk with the nondata islands having alternating perpendicular magnetization directions so that the islands along a track have opposite polarity.
Figure 3B:
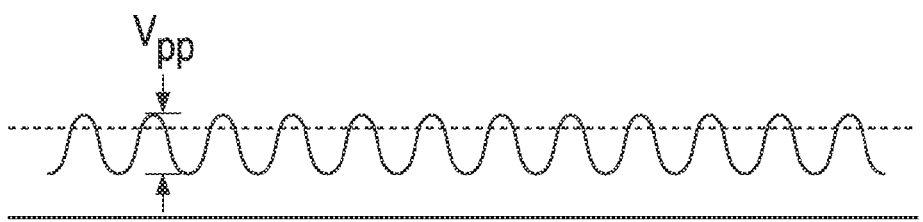
FIG. 3B is a representative signal from a series of nondata islands with all islands being DC-magnetized in the same perpendicular direction so that their magnetizations have a single polarity.

In FIG. 2 all of the islands in sync field 163, data sector 164 and servo sector 120 are discrete nondata islands separated by nonmagnetic spaces 200. Alternating islands (shown with cross-hatching) are magnetized in the opposite direction to the magnetization of the other islands. Thus the magnetizations in the non-cross-hatched islands are antiparallel to the magnetizations in the cross-hatched islands. For perpendicular recording, if the magnetizations in the non-cross-hatched islands are out-of-the paper in FIG. 2, then the magnetizations in the cross-hatched islands would be into-the-paper. If the nondata islands in FIG. 2 repeat with a certain period, and are magnetized in the alternating perpendicular directions so that two adjacent islands will have opposite polarity, then a series of pulses as shown in FIG. 3A will be detected by the read head. The peak-to-peak amplitude $V_{pp}$ in FIG. 3A is more than double the peak-to-peak amplitude if all the nondata islands had the same polarity, like the series of pulses shown in FIG. 3B. The use of opposite polarity nondata islands thus results in a readback signal with improved signal-to-noise ratio (SNR).

However, the nondata regions with islands of alternating polarity must be individually written with either a dedicated servowriter or with the disk drive's write head, which is not cost effective for high-volume disk manufacturing. Also, this method requires some means to precisely time the writing to the individual islands.

In this invention the nondata regions contain nondata islands with different surface areas. A group of first nondata islands with one area have a magnetization in one perpendicular direction, and a group of second nondata islands with a smaller area have a magnetization in the opposite direction, i.e., opposite polarity to that of the first islands. The nondata regions are magnetized in a two-step DC magnetization process over the entire disk, thus eliminating the time consuming and complex method of magnetizing the islands individually with a servowrite or the disk drive's write head.

Figure 4A:
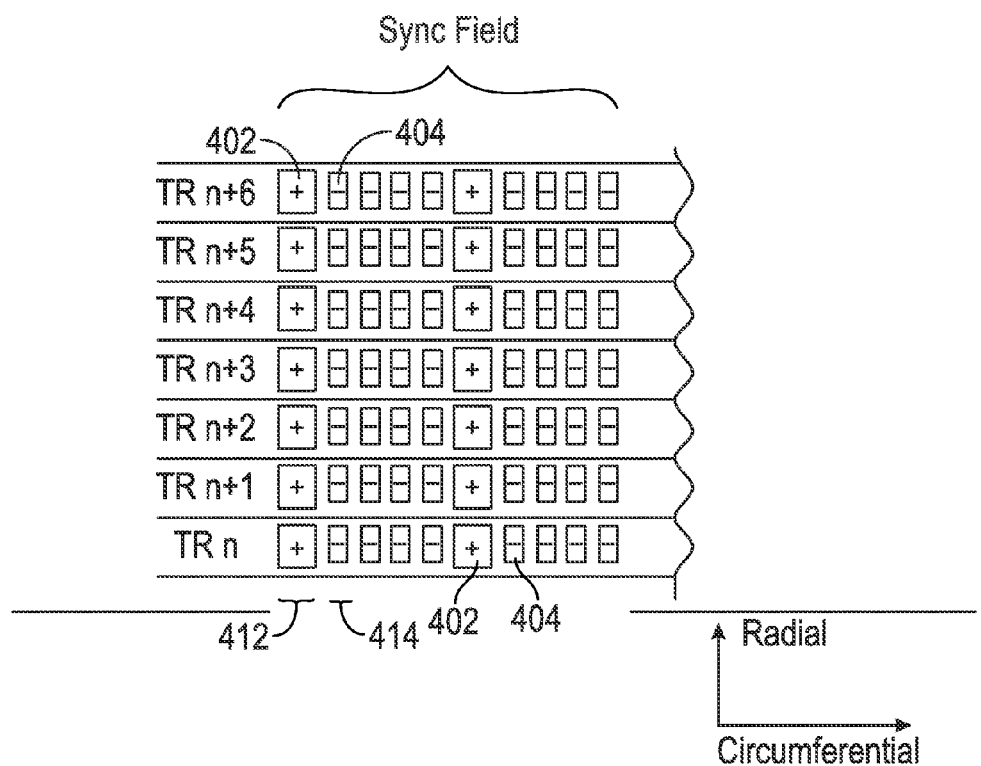
FIG. 4A is an illustration of the pattern of nondata islands according to the invention making up a typical sync field.
Figure 4B:
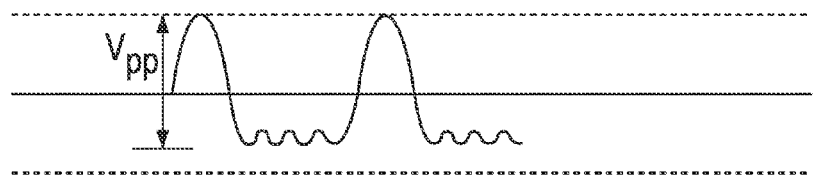
FIG. 4B is a representative readback signal from the read head detecting the pattern of islands in one of the tracks in the sync field of FIG. 4A.

FIG. 4A is an illustration of the pattern of nondata islands according to the invention making up a typical sync field. Two types of nondata islands are depicted: first islands like typical island 402 with a larger surface area, and second islands like typical island 404 with a smaller area. The first islands 402 are magnetized in one perpendicular direction, for example a positive (+) magnetization which may be represented as out of the plane of the disk, while the second smaller islands 404 are magnetized in the opposite perpendicular direction, for example a negative (−) magnetization which may be represented as into the plane of the disk. The nondata islands in the sync field are arranged along the data tracks (TR n to TR n+6). The first islands 402 are arranged in generally radial stripes 412 and the second islands 404 are arranged in generally radial stripes 414 angularly spaced in the along-the track direction from stripes 412. While the stripes 412 and 414 are made up of discrete islands 402, 404, with each island being located along a data track, alternatively each radial stripe could be a single continuous island extending across the tracks. FIG. 4B is a representative readback signal from the read head detecting the pattern of islands 402, 404 in the sync field of one of the data tracks.

Figure 5:
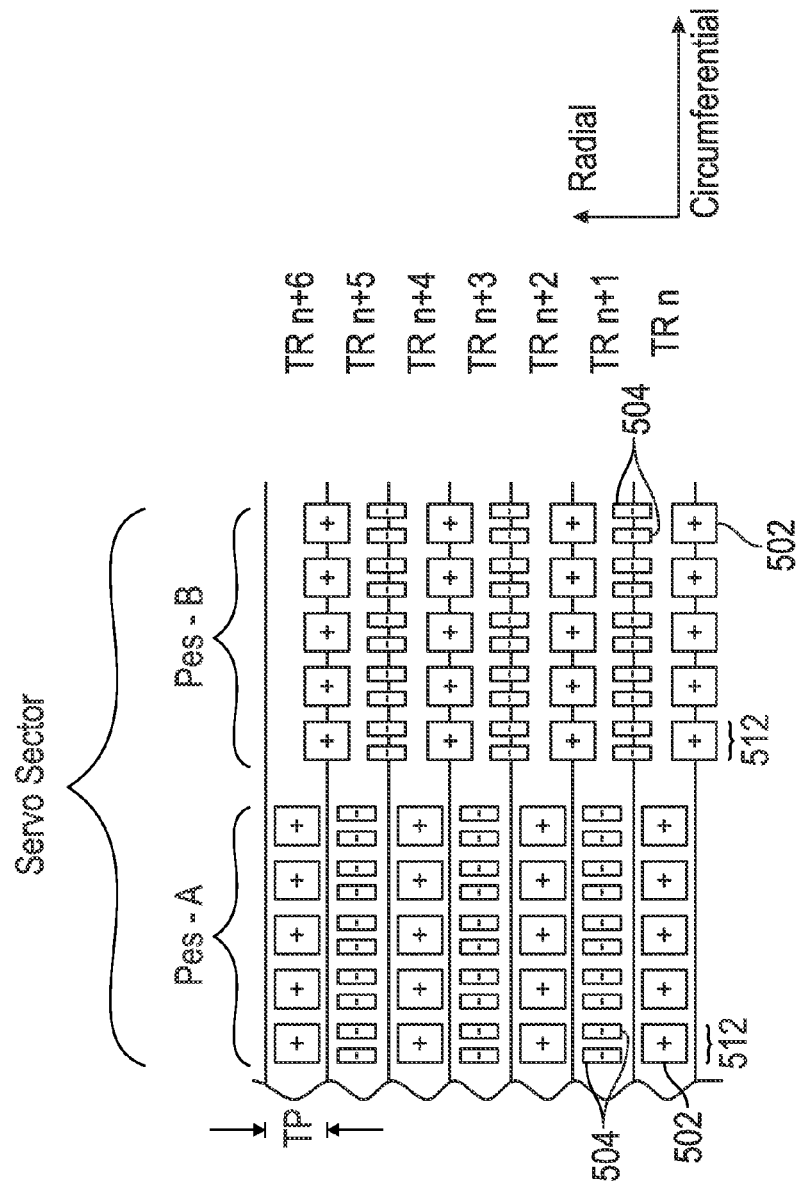
FIG. 5 is an illustration of the pattern of nondata islands according to the invention making up a portion of a servo field in one type of well-known servo pattern.

FIG. 5 is an illustration of the pattern of nondata islands according to the invention making up a portion of a servo field in one type of well-known pattern. Two angularly-spaced PES fields, PES-A and PES-B, are patterned as a well-known offset field servo pattern. In each of the PES-A and PES-B fields, tracks of first islands 502 (e.g., TR n, TR n+2 and TR n+6 in field PES-A) alternate with tracks of second islands 504 (TR n+1, TR n+3 and TR n+5 in field PES-A). The islands are also arranged in radial stripes 512. The patterns in fields PES-A and PES-B are identical but field PES-B is shifted radially from field PES-A, preferably by one-half the track pitch (TP). In this example there are two smaller islands 504 for every larger island 502, but the number of islands 502 could be the same as the number of islands 504, as long as islands 504 have a smaller area than islands 502.

Figure 6:
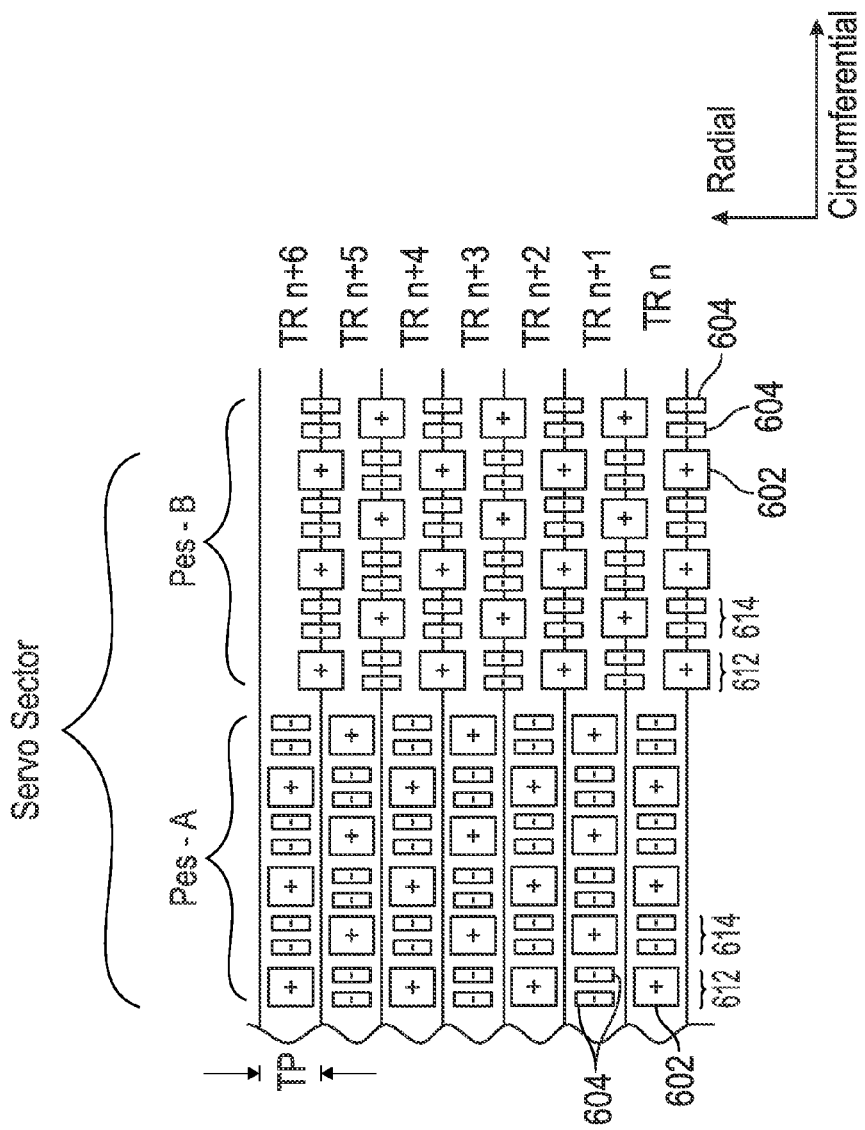
FIG. 6 is an illustration of the pattern of nondata islands according to the invention making up a portion of a servo field in a null servo pattern.

FIG. 6 is an illustration of the pattern of nondata islands making up a portion of a servo field in another type of well-known pattern. Two angularly-spaced PES fields, PES-A and PES-B, are patterned as a well-known null servo pattern. In each of the PES-A and PES-B fields, the islands form a repetitive pattern of first and second islands 602,604 in the along-the-track direction. In each of the PES-A and PES-B fields, the islands also form a repetitive pattern of first and second islands 602, 604 in the generally radial direction, as shown by generally radial stripes 612, 614 of islands. The patterns in fields PES-A and PES-B are identical but field PES-B is shifted radially from field PES-A, preferably by one-half the track pitch (TP). In this example there are two smaller islands 604 for every larger island 602, but the number of islands 602 could be the same as the number of islands 604, as long as islands 604 have a smaller area than islands 602.

Figure 7:
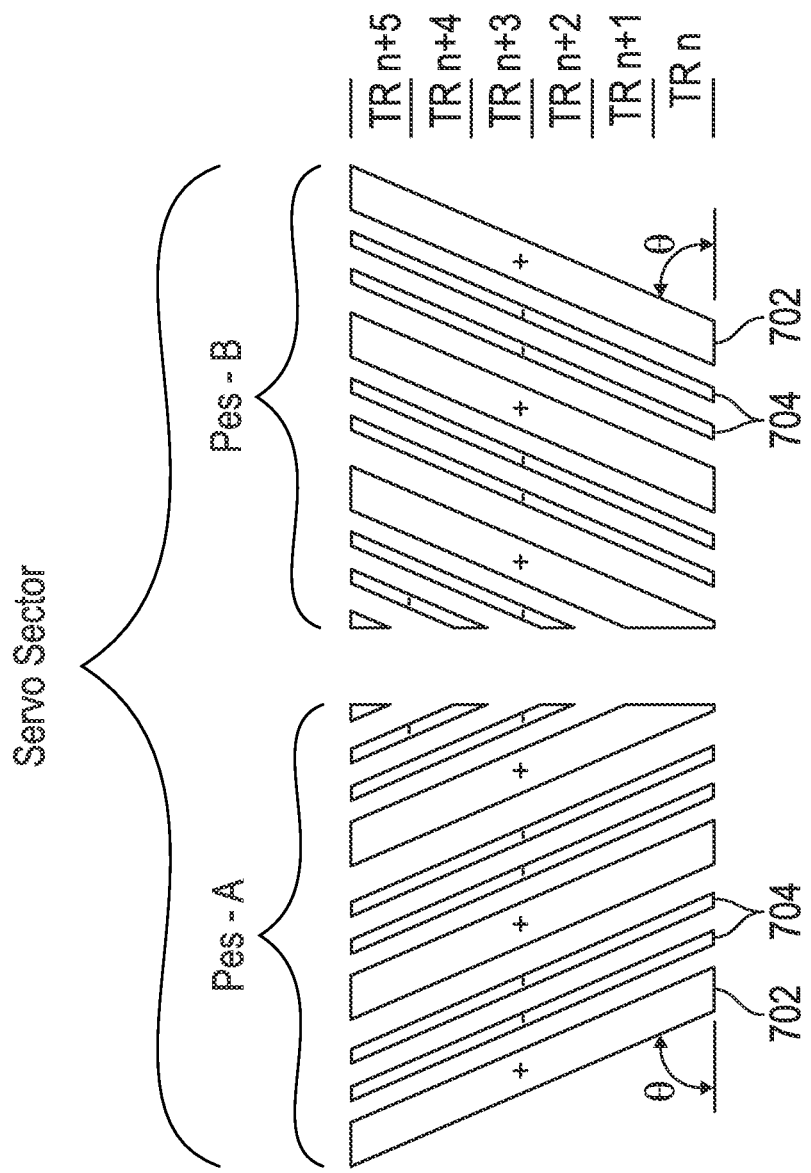
FIG. 7 is an illustration of the pattern of nondata islands according to the invention making up a portion of a servo field in a chevron servo pattern.

FIG. 7 is an illustration of the pattern of nondata islands according to the invention making up a portion of a servo field in another type of well-known pattern. Two angularly-spaced PES fields, PES-A and PES-B, are patterned as a well-known chevron servo pattern. The servo sector includes a V-shaped pattern or inverted V-shaped pattern (sometimes called a chevron pattern) of circumferentially adjacent fields PES-A and PES-B. Each PES field is a repetitive pattern in the along-the-track or circumferential direction of parallel non-radial magnetized larger islands 702 and smaller islands 704. Islands 702 are magnetized in one perpendicular direction and islands 704 are magnetized in the opposite perpendicular direction. The islands 702,704 in field PES-A are slanted in one direction (to the left in FIG. 7) relative to the data tracks at an acute angle θ, and the islands 702,704 in field PES-B are slanted in a different direction (to the right in FIG. 7) relative to the data tracks at an acute angle, preferably the same angle θ. A chevron servo pattern is well-known for conventional disk drives with conventional non-patterned media. The read-back signal registers a sinusoid as the read head passes over each of the two fields of the chevron pattern. If the radial position of the head varies, the phase of one sinusoid will be advanced while the phase of the other sinusoid will be retarded. Thus the radial position of the head can be estimated by measuring the phase difference between the two sinusoidal readback signals.

The sync field pattern of FIG. 4 and the servo patterns of FIGS. 5-7 are merely representative examples of the types of nondata patterns that can be formed using the different-sized nondata islands with opposite polarity as described above. Other nondata marks and patterns can also be formed, including the well-known automatic gain control (AGC) field, as well as the STM and TID marks in the servo sectors.

The method of the invention takes advantage of the magnetic volume, time, and temperature dependence of the switching probability given by the following equation, derived from the Arrhenius-Neel law of thermally-activated switching:

$$P_{switch}(t, H_{app}) = 1 - \exp\left(-t * f_0 \exp\left(-\frac{K_u V}{k_B T}\left(1 - \frac{H_{app}}{H_k}\right)^n\right)\right) \quad \text{Equation (1)}$$

where $H_{app}$ is the applied field, t is the time duration of the applied field, $H_k$ is the anisotropy field, $K_u$ is the anisotropy energy, V is the magnetic volume of the island, $k_B$ is Boltzman's constant, T is the temperature and $f_0$ is the attempt frequency (assumed to be $10^{11}$ Hz). The exponent n is assumed to be equal to 2. Sharrock's law for the time-dependent coercive field is derived by solving for $H_{app}$ with $P_{switch}=0.5$. (M. P. Sharrock, "Time dependence of switching fields in magnetic recording media", *J. Appl. Phys.* 76 (10), 6413, 15 Nov. 1994). $K_u$ and $H_k$ are properties of the magnetic material, but can have an effective distribution with sigma up to 10% from island to island. As can be determined from Equation (1), the probability of switching an island at a fixed $H_{app}$ increases with time t and a decrease in the ratio of $K_u V / k_B T$. A decrease in magnetic volume V of the island is the same as a decrease in area of the island if the islands have the same thicknesses. Thus by careful selection of appropriate values of $H_{app}$, temperature T, and duration t, one can selectively switch with high probability only a population of islands whose volume is below some volume V.

The magnetic recording disk with the magnetizable recording layer having the desired pattern of first and second islands with different areas is magnetized in a two-step process. First, a magnetic field $H_1$ much greater than the coercive field of the magnetic recording layer is applied to the entire disk. The $H_1$ magnetic field is a DC field, i.e., a single-polarity fixed-amplitude field that is sufficiently close to $H_k$ so that all of the islands on the disk are magnetized. This magnetizes both sizes of islands (for example larger islands 402 and smaller islands 404 in FIG. 4A) in the same direction, for example with a positive (+) magnetization which may be represented as out of the plane of the disk. Then the disk is heated to a predetermined temperature $T_0$, and while the disk is at this temperature, a second DC magnetic field $H_2$, which is less than $H_1$ is applied to the entire disk. This reverses the magnetization direction of the smaller islands (from positive to negative in this example) without switching the magnetization of the larger islands. While this second step may not reverse the magnetization of all of the smaller islands, and may reverse the magnetization of some of the larger islands, the error rate can be small enough to be acceptable.

In this invention, the optimal $H_{app}$ ($H_2$) and the temperature $T_0$ are chosen to give an acceptable servo error rate (SER).

SER is defined as the sum of the small islands not switched by $H_{app}$ (applied at temperature T for time t) and the large islands switched by $H_{app}$ (applied at temperature T for time t) divided by the total number of small and large islands. The SER also depends on the switching field distribution (SFD) of the islands, which is determined by the media fabrication process. SFD is typically defined as the island-to-island variation of the coercive field. Ideally the SFD width would be zero, meaning that all the islands would switch at the same field strength. However, variations in the size and shape of the islands, and variations in the composition and crystallographic orientation of the magnetic material result in a non-zero SFD. A higher SFD results in a higher SER. A SFD of up to 10% is a typically expected and acceptable value for BPM disks.

Figure 8A:
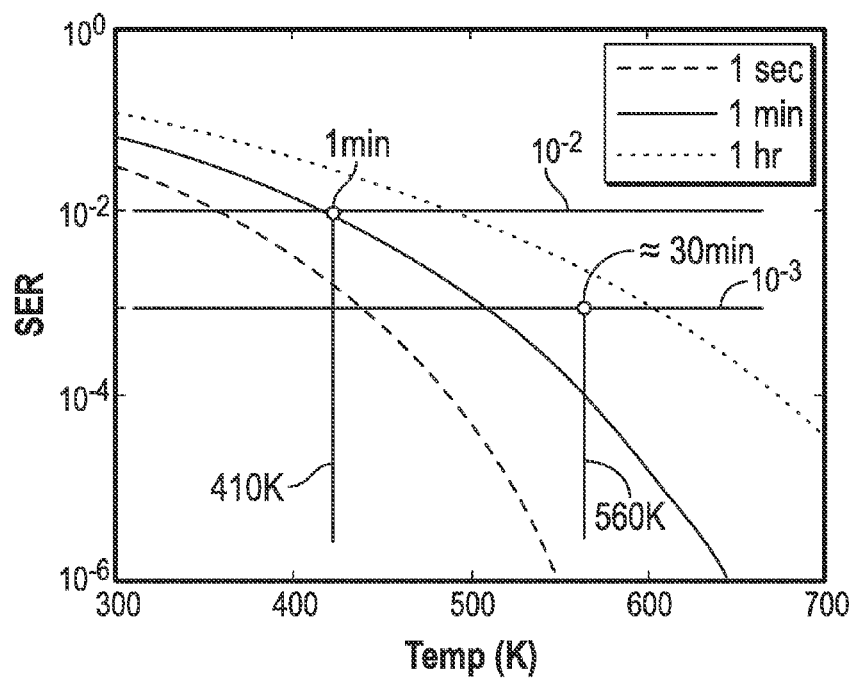
FIG. 8A is a graph of servo error rate (SER) as a function of temperature for various durations of applied field.
Figure 8B:
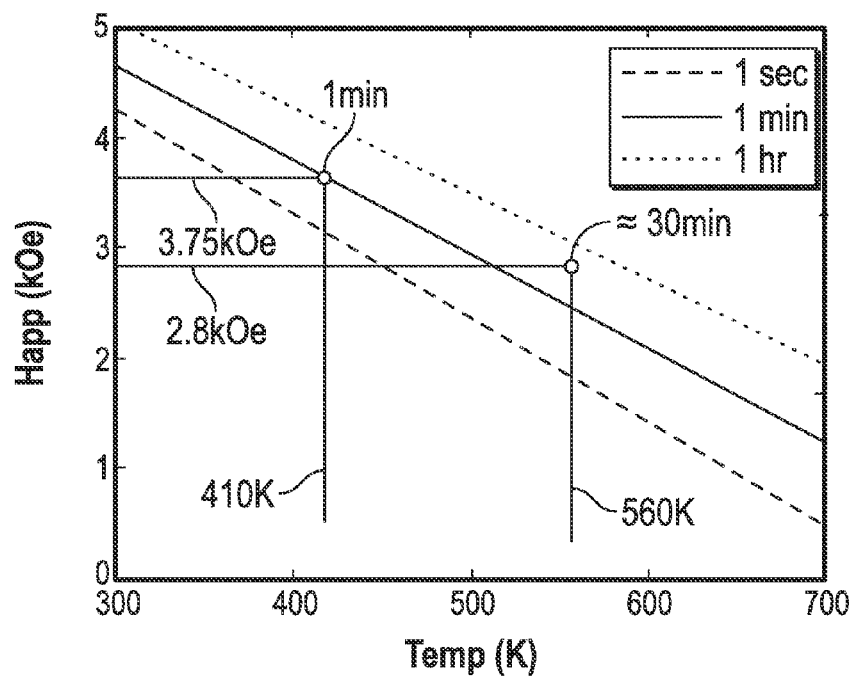
FIG. 8B is a graph of applied field $H_{app}$ as a function of temperature for various durations of applied field.

From Equation (1) the probabilities of switching the small and large islands can be used to calculate the SER as a function of applied field $H_{app}$, temperature T and duration t. This is shown in FIGS. 8A-8B. For these figures it is assumed that all of the islands have an $H_k$ of 10 kOe, the SFD is 10% and assumed to mainly stem from $H_k$ distributions, and the volume ratio (area ratio) of the small islands to the large islands is 1:2. $K_u$ for the small islands is selected so that the $K_u V / k_B T$ ratio at T=300 K is 80, which is sufficient to minimize unintended thermally activated reversal during the operational lifetime of the media. Typical minimal allowed average $K_u V / k_B T$ values can range between 70 and 120, depending on the application and process tolerances. Tighter volume distributions allow lower average $K_u V / k_B T$ values. The allowed acceptable SER depends on system design, e.g., channel settings and error rejection code. For allowed SER, one can select the duration t to determine the temperature T and optimal applied field $H_{app}$ from the curves in FIGS. 8A-8B. For example, using FIG. 8A, choosing a t of 1 min for a maximum SER of $10^{-2}$ results in a minimum T of about 410 K, which on FIG. 8B corresponds to an optimal $H_{app}$ of about 3.75 kOe. Thus for this example of island size and magnetic properties, the sync field patterns of FIG. 4 and the servo patterns of FIGS. 5-7 would be magnetized by first applying a DC field of $H_1$ close to $H_k$ for example 9 kOe for 1 second then heating the disk to at $T_0$ of 410 K while applying a DC field $H_2$ of 3.75 kOe of reverse polarity for 1 minute. Other combinations of $H_2$, $T_0$ and t are possible, one of which is shown in FIGS. 8A-8B for a duration t of approximately 30 minutes with a lower acceptable SER of $10^{-3}$. This results in a lower $H_2$ of 2.8 kOe but at a higher temperature $T_0$ of 560 K. Even lower SER values, near $10^{-6}$, can be achieved with a $T_0$ between about 550-600 K which would require $H_2$ of between about 15.5-2.5 kOe.

Equation (1) can be used to generate curves like FIGS. 8A-8B for different small/large island area ratios other than 1:2. In general, the ability to independently address small islands become more difficult the closer the ratio is to 1:1. The upper area ratio is approximately 1:1.25 because at that ratio temperatures near 700 K are required to achieve a SER of $10^{-2}$. The lower area ratio is fixed by practical fabrication and not addressability concerns. Island area ratios down to 1:10 or less can be fabricated, but produce diminishing returns in the ability of the islands to be independently initialized.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
a recording layer of magnetizable material having a data region for the recording of data in a plurality of generally concentric circular data tracks, and a plurality of nondata regions extending generally radially across the tracks;
wherein the nondata regions are patterned into discrete nondata first and second islands, the first islands having an area and a magnetization in one direction and the second islands having an area different from the area of the first islands and a magnetization in a direction opposite the magnetization direction of the first islands.

2. The disk of claim 1 wherein the nondata regions are synchronization marks wherein the first and second islands are arranged along-the-tracks, the first islands further arranged in generally radial stripes across the tracks and the second islands further arranged in generally radial stripes across the tracks.

3. The disk of claim 1 wherein the nondata regions are synchronization marks wherein the first and second islands are discrete continuous generally radial stripes extending across the tracks.

4. The disk of claim 1 wherein the nondata regions are servo sectors, each servo sector comprising two angularly spaced position error signal (PES) fields, each of the first and second PES fields comprising tracks of first islands and tracks of second islands wherein the tracks of first islands and tracks of second islands alternate in the radial direction, and wherein the islands in the second PES field are shifted radially relative to the islands in the first PES field.

5. The disk of claim 4 wherein the number of second islands in each track of second islands is twice the number of first islands in each track of first islands.

6. The disk of claim 4 wherein the tracks in each PES field have a track pitch (TP) in the radial direction and wherein said radial shift of the islands in the second PES field is one-half TP.

7. The disk of claim 1 wherein the nondata regions are servo sectors, each servo sector comprising two angularly spaced position error signal (PES) fields, the islands in each of the first and second PES fields forming a repetitive pattern of first and second islands in the along-the-track direction and a repetitive pattern of first and second islands in the generally radial direction, and wherein the islands in the second PES field are shifted radially relative to the islands in the first PES field.

8. The disk of claim 7 wherein the repetitive pattern of first and second islands in the along-the-track direction comprises a single first island and two second islands adjacent said single first island.

9. The disk of claim 7 wherein the tracks in each PES field have a track pitch (TP) in the radial direction and wherein said radial shift of the islands in the second PES field is one-half TP.

10. The disk of claim 1 wherein the nondata regions are servo sectors, each servo sector comprising two angularly spaced position error signal (PES) fields, each field comprising first and second islands formed as discrete continuous stripes slanted at an acute angle relative to the data tracks, wherein the stripes in the first field and the stripes in the second field are slanted in different directions and the acute angle of the stripes the first field is substantially the same as the acute angle of the stripes in the second field.

11. The disk of claim 1 wherein the ratio of the area of the second islands to the area of the first islands is between 1:1.25 and 1:10.

12. The disk of claim 1 wherein the data tracks are patterned into discrete data islands of magnetizable material separated by nonmagnetic spaces.

13. The disk of claim 1 wherein the data tracks are continuous magnetizable material of the recording layer.

14. The disk of claim 1 wherein the data tracks are discrete data tracks of continuous magnetizable material of the recording layer separated by concentric nonmagnetic guard bands.

15. A method for making a perpendicular magnetic recording disk comprising:
providing a disk with a recording layer of magnetizable material having a plurality of generally radial nondata regions patterned into a plurality of discrete nondata first islands having substantially the same area and a plurality of discrete nondata second islands having substantially the same area smaller than the area of the first islands;
applying a first DC magnetic field to the recording layer at a first temperature in a direction orthogonal to the recording layer to magnetize the first and second islands in the same direction; and
while maintaining the recording layer at a second temperature greater than said first temperature, applying a second DC magnetic field for a time duration to the recording layer in a direction orthogonal to the recording layer and opposite the direction of the first DC magnetic field to reverse the magnetization of the second islands.

16. The method of claim 15 wherein said first temperature is room temperature.

17. The method of claim 15 wherein providing a disk comprises providing a disk wherein the ratio of the area of the second islands to the area of the first islands is between 1:1.25 and 1:10.

18. The method of claim 15 wherein providing a disk comprises providing a bit-patterned-media disk wherein the magnetic recording layer is patterned into concentric data tracks of discrete data islands separated by nonmagnetic spaces and wherein said nondata regions are angularly spaced and extend generally radially across the data tracks.

19. The method of claim 15 wherein providing a disk comprises providing a continuous-media disk wherein the magnetic recording layer comprises continuous magnetizable material and wherein said nondata regions are angularly spaced and extend generally radially across the disk.

20. The method of claim 15 wherein providing a disk comprises providing a discrete-track-media disk wherein the magnetic recording layer is patterned into concentric discrete data tracks separated by concentric nonmagnetic guard bands and wherein said nondata regions are angularly spaced and extend generally radially across the discrete data tracks.

21. The method of claim 15 wherein maintaining the recording layer at a temperature greater than said first temperature and applying a second DC magnetic field for a time duration comprises maintaining the recording layer at a predetermined temperature $T_0$ while applying the second DC magnetic field at a predetermined field $H_2$ for a predetermined time duration sufficient to achieve an acceptable error rate, the error rate being the number of first and second islands having an incorrect magnetization direction divided by the total number of first and second islands.

22. The method of claim 15 wherein the island magnetization error rate is the number of first and second islands having an incorrect magnetization direction divided by the total number of first and second islands, the method further comprising selecting an acceptable error rate, determining from said selected acceptable error rate a time duration t and a temperature $T_0$ at which to apply said second DC magnetic field, and determining from t and $T_0$ the magnitude $H_2$ of said second DC magnetic field.

* * * * *